Oct. 25, 1932.  H. C. JOHANSEN  1,884,717
CHUCK MECHANISM
Filed April 8, 1930
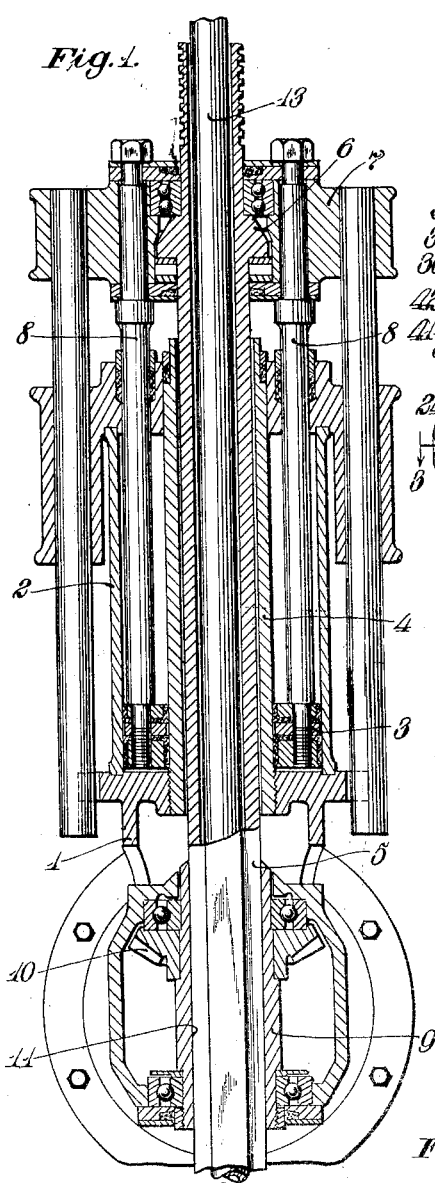
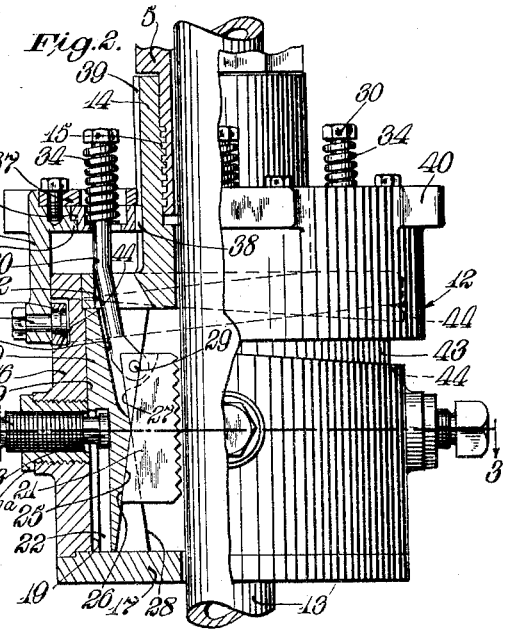
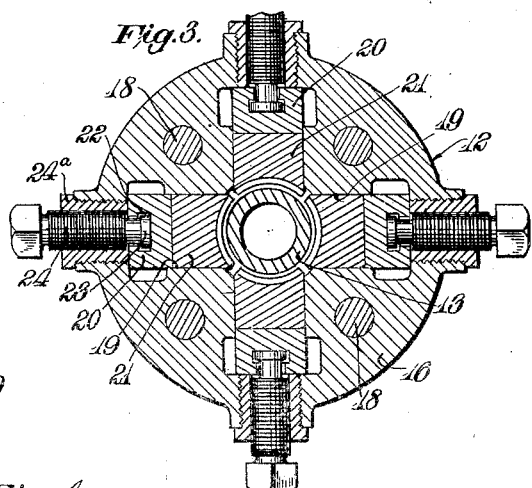
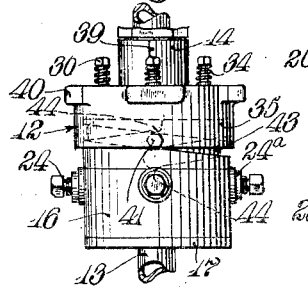
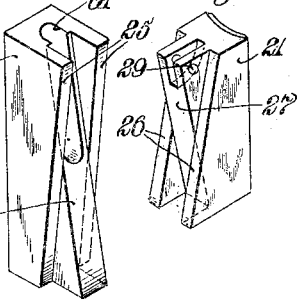
Inventor:
Harry C. Johansen.
by
Atty.

Patented Oct. 25, 1932

1,884,717

UNITED STATES PATENT OFFICE

HARRY C. JOHANSEN, OF MICHIGAN CITY, INDIANA, ASSIGNOR TO SULLIVAN MACHINERY COMPANY, A CORPORATION OF MASSACHUSETTS

CHUCK MECHANISM

Application filed April 8, 1930. Serial No. 442,644.

This invention pertains to chuck mechanisms and more particularly, but not exclusively, to improvements in an automatic drill rod chuck for a rotary core drilling apparatus.

An object of this invention is to provide an improved automatic chuck. Another object is to provide an improved automatic chuck adapted to grip automatically the work in either direction of movement thereof. A further object is to provide an improved automatic drill rod chuck adapted to operate on a drill rod of a rotary core drilling apparatus. Still another object is to provide an improved automatic drill rod chuck adapted to grip the rod to force the same downwardly, to hold the weight of the rod or to positively grip the rod. Yet another object is to provide an improved automatic drill rod chuck which is adapted to replace the usual top and bottom chucks of a rotary core drilling apparatus. These and other objects and advantages of this invention will, however, hereinafter more fully appear.

In the accompanying drawing, there is shown for purposes of illustration one form which the invention may assume in practice.

In this drawing,—

Fig. 1 is a sectional view of a hydraulic feeding mechanism of a core drilling apparatus with which the improved automatic chuck is associated, the improved automatic chuck being shown in elevation.

Fig. 2 is an enlarged detail view of the improved automatic chuck, parts being shown in vertical section to illustrate structural details.

Fig. 3 is a transverse sectional view taken substantially on line 3—3 of Fig. 2.

Figs. 4 and 5 are detail perspective views of one of the jaw blocks and chuck jaws respectively.

In this illustrative construction there is shown a hydraulic drill rod feeding mechanism comprising a swivel head frame 1 having mounted thereon a feed cylinder 2 in which a feed piston 3 is mounted for reciprocable movement. Arranged centrally within the cylinder is a sleeve 4 forming the inner wall of the cylinder and presenting an opening through which the usual drive rod 5 extends. This drive rod is provided with a collar 6 mounted between thrust bearings carried by a usual thrust head 7 to which the upper ends of the feed piston rods 8 are attached. Journaled within the lower portion of the swivel frame is a rotating member 9 driven through suitable transmission connections including a bevel gear 10 from the driving engine of the drilling apparatus. This rotating member is provided with a polygonal opening 11 and the drive rod 5 is formed of hexagonal cross section throughout the portion of its length to fit this opening. Fluid under pressure is delivered through any suitable connections to either side of the feed piston to effect raising and lowering of the drive rod.

The rotating member 9 is adapted to rotate the drive rod as it is fed axially therethrough by the hydraulic feeding mechanism. The improved automatic chuck mechanism generally designated 12 is attached to the lower end of the drive rod 5. Extending centrally through the drive rod is a drill rod 13 upon which the improved automatic chuck is adapted to act.

Now referring to the improved automatic chuck mechanism, it will be noted that the same herein comprises an upper drive plate 14 threadedly connected at 15 to the lower end of the drive rod 5. The chuck body is indicated at 16 and the bottom plate at 17 and the upper and bottom plates and the chuck body are held in assembled relation by means of bolts 18. Formed in the chuck body are radial slots or chambers 19, herein four in number, which receive jaw blocks or wedges 20 and chuck jaws 21. The jaw blocks or wedges 20 have formed therein T-shaped slots 22 which receive the heads 23 of set screws 24 and these set screws are each threadedly connected to a wearing bushing 24ª in turn threadedly connected to the body of the chuck. Each of the wedges 20 is provided with parallel inclined surfaces 25 engaging with correspondingly inclined surfaces 26 on the chuck jaws, while the jaws are each provided with an inclined surface 27 engageable with a correspondingly inclined surface 28 on the wedges, the surfaces 25, 26 being inclined oppositely from the surfaces 27, 28. In the present construction, pivotally connected at 29 to each of the chuck jaws 21 is a bolt 30 extending through a cut away portion 31 in the inclined surface 28 of the jaw block and through an opening 32 in the upper drive plate. Interposed between the heads of these bolts and a plate 33 are springs 34, the bolts extending through openings in this plate and the plate having chambers guiding the lower ends of the springs. This plate 33 is supported for free relative rotation on a ring 35 and is held in position on the ring between a radial flange 36 and a removable detachable plate 37 secured to the ring 35. The plate 33 has a straight key 38 which engages a straight keyway 39 formed in the hub of the upper drive plate 14. The ring 35 is provided with grasping portions 40 and carries on a radial pin 41 a roller 42. This roller engages a spiral groove 43 formed in the body of the chuck. This groove is of such length as to permit one full turn of the ring 35 and has formed at its ends and intermediate its ends notches or slots 44 with which the roller engages to hold the ring 35 in its two extreme positions or its central position as desired. The upper and bottom plates have formed therein central openings through which the drill rod extends and the chuck jaws are provided with teeth in a usual manner to grip the drill rod.

When the parts are in the position shown in Fig. 2 the chuck jaws are in their intermediate or neutral position. If it is desired to connect positively the drill rod to the drive rod 5 for feeding purposes, this may be accomplished merely by screwing inwardly the set screws 24 to force the teeth of the chuck jaws 21 into gripping engagement with the drill rod. The drill rod may then be fed upwardly or downwardly as desired by piston 3 of the hydraulic feeding mechanism in a manner well understood in the art. Downward feed, with automatic release on upward movement of the piston, can be effected by moving the ring 35 upwardly, with the screws 24 in the position of Fig. 2. The wedges 20 will then force the jaws into engagement with the drive rod, due to the cooperation of surfaces 25 and 26. When the extreme forward feeding movement of the feed piston is reached, the latter may be reversed, causing the jaws 21 to move downwardly into their released position, the coil springs 34 at that time permitting downward movement of the bolts 30 attached to the chuck jaws. It will thus be seen that by simple reverse movement of the feed piston the chuck is automatically released, permitting the feed piston and chuck to travel into their uppermost position whereupon when forward movement of the feed piston is resumed, the drill rod is again automatically gripped. It will be evident that if it is desired to move the drill rod upwardly while the wedges 20 are in the position of Fig. 2, the operator rotates the ring 35 to a position to move the chuck jaws into their lowermost position and the chuck jaws automatically move inwardly along the inclined surfaces 28 on the jaw blocks with a wedging action, and automatically grip the drill rod. It is evident that when the chuck is moved in a direction opposite from its operative direction of gripping, the chuck jaws automatically move toward their central or neutral position shown in Fig. 2. It will therefore be evident that when the chuck jaws are in their lower position and upward feed is effected, the drill rod is automatically gripped, but upon reverse of the feed release of the drive rod is automatically effected; that when the chuck jaws are in their uppermost position and forward feed is effected, the drill rod is likewise automatically gripped, but is automatically released on reversal of the feed; and that when the chuck jaws are placed in their intermediate or neutral position by positioning ring 35 in the neutral position of Fig. 2, the drill rod is entirely disconnected from the feed. It will also be evident that by tightening the chuck jaws when in their central or neutral position the drill rods may be positively gripped.

As a result of this invention, it will be noted that an improved automatic chuck is provided which has all the functions of the usual top, bottom and drive chucks of a core drilling apparatus, the improved automatic chuck being controllable to automatically grip the drill rod in either direction of movement thereof or to be manually adjusted into positive gripping position with the drill rod. It will further be noted that an improved automatic chuck is provided which is automatically released upon reverse movement of the feeding means, thereby enabling the feed piston to quickly return to its opposite position without the necessity of manually adjusting the chuck parts, the chuck thereafter automatically gripping the rod when forward feeding movement of the feed piston is resumed. These and other uses and advantages of the improved automatic chuck mechanism will be clearly apparent to those skilled in the art.

While there is in this application specifically described one form which the invention may assume in practice, it will be understood that this form of the same is shown for purposes of illustration and that the invention may be modified in various other forms without departing from its spirit or the scope of the appended claims.

What I claim as new and desire to secure by Letters Patent is:

1. A drill rod chuck mechanism comprising a body, chuck jaws carried thereby and adapted to grip a drill rod, and means for oppositely positioning said jaws in said body to grip automatically a drill rod upon movement of the chuck mechanism selectively in either direction.

2. A drill rod chuck mechanism comprising a body, adjustable jaw blocks in said body having oppositely inclined surfaces, means for adjusting said jaw blocks relative to said body, chuck jaws in said body having oppositely inclined surfaces engaging the inclined surfaces on said jaw blocks and adapted to grip a drill rod, and means for positioning said chuck jaws relative to said jaw blocks to grip automatically a drill rod upon movement of the chuck mechanism in either direction.

3. A drill rod chuck mechanism comprising a body, chuck jaws carried thereby and adapted to grip a drill rod, means for yieldably supporting said jaws in said body, means engageable with said yieldable means for positioning said jaws in said body to grip automatically a drill rod upon movement of the chuck mechanism in one direction, and means for positioning said jaws to grip positively a drill rod to preclude movement thereof in either direction relative to the chuck body.

4. A drill rod chuck mechanism comprising a body, chuck jaws carried thereby and adapted to grip a drill rod, means for yieldably supporting said jaws in said body, and means for oppositely positioning said jaws in said body to grip automatically a drill rod upon movement of the chuck mechanism selectively in either direction.

5. A drill rod chuck mechanism comprising a body, chuck jaws carried thereby and adapted to grip a drill rod, means for yieldably supporting said chuck jaws in said body, means engageable with said yieldable means for positioning said jaws in said body to grip automatically a drill rod in one direction, said chuck jaws being adapted to release automatically in the opposite direction, and means for positioning said jaws to grip positively a drill rod to preclude movement thereof relative to the chuck body in either direction.

6. A drill rod chuck mechanism comprising a body, chuck jaws carried by said body and adapted to grip a drill rod, and means for placing said jaws in one position in said body to grip automatically a drill rod upon movement of the chuck mechanism in one direction, in another position to grip automatically a drill rod upon movement of the chuck mechanism in the reverse direction, and into a third position wherein the chuck jaws are released.

7. A drill rod chuck mechanism comprising a body, chuck jaws carried by said body and adapted to grip a drill rod, means for adjusting said jaws relative to said body to grip positively a drill rod, and separate means for positioning said jaws in said body to grip automatically a drill rod upon movement of the chuck mechanism in one direction.

8. A drill rod chuck mechanism comprising a body, chuck jaws carried by said body and adapted to grip a drill rod, means for adjusting said jaws relative to said body to grip positively a drill rod, and means for oppositely positioning said jaws in said body to grip automatically a drill rod upon movement of the chuck mechanism selectively in either direction.

9. A drill rod chuck mechanism comprising a power actuated element, a chuck body carried thereby, chuck jaws in said body and adapted to grip a drill rod, and means for oppositely positioning said jaws in said body to grip automatically a drill rod upon actuation of said power element in either direction.

10. A drill rod chuck mechanism comprising a power actuated element, a chuck body carried thereby, chuck jaws in said body and adapted to grip a drill rod, and means for positioning said jaws in said body to grip automatically a drill rod upon movement of said power element in one direction, said jaws automatically releasing upon movement of said power element in the reverse direction.

11. A drill rod chuck mechanism comprising a body having means therein presenting oppositely inclined surfaces, chuck jaws carried by said body and each having oppositely inclined surfaces engageable with said first mentioned surfaces and adapted to grip a drill rod, and means for positioning said jaws to obtain a wedging action along said surfaces in either direction.

12. A drill rod chuck mechanism comprising a body, means therein presenting oppositely inclined upper and lower surfaces, chuck jaws carried by said body and each having oppositely inclined surfaces engageable with said first mentioned surfaces and adapted to grip a drill rod, and means for positioning said jaws to obtain a wedging action along either said upper or lower inclined surfaces to grip automatically a drill rod upon movement of the chuck mechanism in either direction.

13. A drill rod chuck mechanism comprising a body, means therein presenting oppositely inclined upper and lower surfaces, chuck jaws carried by said body and having oppositely inclined surfaces engageable with said first mentioned surfaces and adapted to grip a drill rod, means for positioning said jaws to obtain a wedging action along either said upper or lower inclined surfaces to grip automatically a drill rod upon movement of the chuck mechanism in either direction, and means operative when said jaws are in their central position between said upper and lower surfaces to adjust said jaws relative to said body to grip positively a drill rod.

14. A drill rod chuck mechanism comprising a body, means therein presenting oppositely inclined upper and lower surfaces, chuck jaws in said body having oppositely inclined surfaces engageable with said first mentioned surfaces, and manually operable means connected to said body for adjusting said jaws upwardly or downwardly to obtain a wedging action along said surfaces in either direction.

15. A drill rod chuck mechanism comprising a body, jaw blocks adjustably mounted therein and having oppositely inclined surfaces, means for adjusting said jaw blocks relative to said body, chuck jaws carried by said body and having oppositely inclined surfaces engageable with said first mentioned surfaces and adapted to grip a drill rod, and means for adjusting said jaws along either of said jaw block surfaces to obtain a wedging action in either direction.

16. A drill rod chuck mechanism comprising a body, chuck jaws carried by said body and movable into opposite gripping positions and adapted to grip a drill rod, and means including an operating element rotatable relative to said body and supported thereby for positioning said jaws in said body to grip automatically a drill rod upon movement of the chuck mechanism in either direction.

17. A drill rod chuck mechanism comprising a body, chuck jaws carried by said body and movable into opposite gripping positions and adapted to grip a drill rod, means including an operating element rotatable relative to said body and supported thereby for positioning said jaws in said body to grip automatically a drill rod upon movement of the chuck mechanism in either direction, and means for yieldably supporting said chuck jaws on said rotatable element.

18. A drill rod chuck mechanism comprising a body, chuck jaws carried by said body and movable into opposite gripping positions and adapted to grip a drill rod, and means including an operating element rotatable relative to said body and supported thereby for positioning said jaws in said body to grip automatically a drill rod upon movement of the chuck mechanism in either direction, said rotatable element upon rotation thereof relative to said body moving either upwardly or downwardly relative to said body to effect positioning of said chuck jaws.

19. A drill rod chuck mechanism comprising a body, chuck jaws adjustably mounted therein and selectively adjustable into one position to grip a drill rod in one direction and into another relatively opposite position to grip a drill rod in the opposite direction, and means for adjusting said jaws into aforesaid positions.

20. A drill rod chuck mechanism comprising a body, chuck jaws adjustably mounted therein and selectively adjustable into one position to grip a drill rod with a wedging action in one direction and into another relatively opposite position to grip a drill rod with a wedging action in the opposite direction, and means for adjusting said jaws into aforesaid positions.

21. A drill rod chuck mechanism comprising a body having therein means presenting oppositely inclined wedging surfaces, and chuck jaws adjustably mounted in said body and each having oppositely inclined surfaces engageable with said inclined wedging surfaces.

22. A drill rod chuck mechanism comprising a body having therein means presenting oppositely inclined wedging surfaces, and chuck jaws adjustably mounted in said body and each having oppositely inclined surfaces engageable with said inclined wedging surfaces and adapted to grip automatically with a wedging action a drill rod upon movement of the chuck mechanism in either direction.

23. A drill rod chuck mechanism comprising a body, chuck jaws carried thereby and adapted to grip a drill rod, means for yieldably supporting said jaws in said body, means for positioning said jaws in said body to grip automatically a drill rod upon movement of the chuck mechanism in one direction, and means separate from said first mentioned positioning means for positioning said jaws to grip positively a drill rod to preclude movement thereof in either direction relative to the chuck body.

24. A drill rod chuck mechanism comprising a body, chuck jaws carried thereby and adapted to grip a drill rod, means for yieldably supporting said chuck jaws in said body, means for positioning said jaws in said body to grip automatically a drill rod in one direction, said chuck jaws being adapted to release automatically in the opposite direction, and means separate from said first mentioned positioning means for positioning said jaws to grip positively said drill rod to preclude movement thereof relative to the chuck body in either direction.

25. A drill rod chuck mechanism comprising a body, chuck jaws carried by said body and adapted to grip a drill rod, means for adjusting said jaws relative to said body to grip positively a drill rod, and means separate from said adjusting means for positioning said jaws in said body to grip automatically a drill rod upon movement of the chuck mechanism in either direction.

26. A drill rod chuck mechanism comprising a power actuated element, a chuck body carried thereby, chuck jaws in said body and adapted to grip a drill rod, and means for oppositely positioning said jaws in said body to grip automatically a drill rod upon actuation of said power element selectively in either direction.

27. A drill rod chuck mechanism comprising a body, chuck jaws carried thereby and adapted to grip a drill rod, and means connected to said jaws and operable at will for oppositely positioning said jaws in said body to grip automatically a drill rod upon movement of the chuck mechanism in either direction.

28. A drill rod chuck mechanism comprising a body, chuck jaws carried thereby and adapted to grip a drill rod, and means including a manual control element connected to all of said jaws and operable at will for oppositely positioning said jaws in said body to grip automatically a drill rod upon movement of the chuck mechanism in either direction.

29. A drill rod chuck mechanism comprising a body, chuck jaws carried thereby and each adapted to grip a drill rod in either direction, and means for oppositely positioning said jaws in said body to grip automatically a drill rod upon movement of the chuck mechanism in either direction.

30. A drill rod chuck mechanism comprising a body, chuck jaws carried thereby and each adapted to grip a drill rod in either direction, and means for positioning said jaws in said body to grip automatically a drill rod upon movement of the chuck mechanism in either direction and including a manual control element connected to said jaws and movable in one position to cause the jaws to grip the rod in one direction and into another position to cause the jaws to grip the rod in the opposite direction.

In testimony whereof I affix my signature.

HARRY C. JOHANSEN.